US007191520B2

(12) United States Patent
Shantharama et al.

(10) Patent No.: US 7,191,520 B2
(45) Date of Patent: Mar. 20, 2007

(54) METHOD OF OPTMIZING INKJET PRINTHEADS USING A PLASMA-ETCHING PROCESS

(75) Inventors: Lingadahalli G. Shantharama, Penfield, NY (US); John A. Lebens, Rush, NY (US); Thomas M. Stephany, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 200 days.

(21) Appl. No.: 10/795,050

(22) Filed: Mar. 5, 2004

(65) Prior Publication Data

US 2005/0193558 A1 Sep. 8, 2005

(51) Int. Cl.
*B21D 53/76* (2006.01)
*G01D 15/00* (2006.01)

(52) U.S. Cl. ......................... 29/890.1; 29/594; 29/831; 29/832; 216/27

(58) Field of Classification Search ............... 29/890.1, 29/831, 832, 594; 216/27, 41, 39, 56, 67, 216/67.2, 2, 46, 72; 347/47, 63, 20
See application file for complete search history.

(56) References Cited

U.S. PATENT DOCUMENTS

| | | | | |
|---|---|---|---|---|
| 5,204,690 | A * | 4/1993 | Lorenze et al. | 347/93 |
| 5,478,606 | A | 12/1995 | Ohkuma et al. | |
| 5,690,841 | A * | 11/1997 | Elderstig | 216/39 |
| 5,760,804 | A | 6/1998 | Heinzl et al. | |
| 5,844,360 | A * | 12/1998 | Jeong et al. | 313/495 |
| 6,019,457 | A | 2/2000 | Silverbrook | |
| 6,036,874 | A * | 3/2000 | Farnaam | 216/27 |
| 6,171,510 | B1 * | 1/2001 | Lee | 216/27 |
| 6,482,574 | B1 * | 11/2002 | Ramaswami et al. | 430/320 |
| 6,557,967 | B1 * | 5/2003 | Lee | 347/20 |
| 6,561,626 | B1 | 5/2003 | Min et al. | |
| 2003/0109073 | A1 | 6/2003 | Park et al. | |

* cited by examiner

*Primary Examiner*—A. Dexter Tugbang
*Assistant Examiner*—Tai Van Nguyen
(74) *Attorney, Agent, or Firm*—Peyton C. Watkins

(57) ABSTRACT

A method for creating an inkjet chamber. The method comprises the steps of firstly providing a substrate having a nozzle opening and secondly etching the substrate through the nozzle opening by alternating between anisotropic and isotropic etching processes for forming a chamber having a shape approximating a cylinder by using multiple hemispheric etches.

13 Claims, 4 Drawing Sheets

METHOD OF OPTMIZING INKJET PRINTHEADS USING A PLASMA-ETCHING PROCESS

FIELD OF THE INVENTION

The invention relates generally to the field of inkjet recording heads, and in particular to a method of manufacturing an inkjet chamber. More specifically, the invention relates to the manufacture of inkjet chambers using an etching scheme that alternates between isotropic and anisotropic etches. This process enhances the performance of an inkjet recording device by enabling a finer control of detail within an inkjet chamber through the use of colorless, odorless, nontoxic, non-flammable liquefied gasses such as SULFURHEXAFLUORIDE $SF_6$, and OCTAFLUOROCYCLOBUTANE $C_4F_8$, that are each used specifically for the type of etching performed.

BACKGROUND OF THE INVENTION

An inkjet recording head typically comprises outlets or nozzles that serve to eject tiny droplets of liquids used in a recording process. Situated behind the nozzles, a chamber exists that contains both electrically activated thermal electrodes producing bubbles to eject the drops, and a chamber that encloses the aforementioned electrodes.

A more conventional method of ejecting drops is commonly referred to as the roof-shooter method. In the roof-shooter method the bubble grows in the same direction as the drop is ejected. A typical manufacturing process for a roof-shooter inkjet recording head is represented in U.S. Pat. No. 5,478,606 by Ohkuma et al. Recently a back-shooter method has been disclosed in U.S. Pat. No. 5,760,804 to Heinzl et al. issued Jun. 2, 1998. In the back-shooter method the bubble grows in opposite direction to the drop ejection direction.

In the back-shooter configuration the design properties of the chamber are important in order to optimize the drop ejection and chamber refill efficiencies. These properties help achieve a high drop ejection frequency. Typical chamber structures are disclosed in U.S. Pat. No. 6,019,457 to Silverbrook issued Feb. 1, 2000 and U.S. Pat. No. 6,561,626 to Jae-sik Min et al. issued May 13, 2003. The aforementioned prior art describes a chamber, hemispheric in shape, formed by isotropic etching with an ink inlet, the same diameter as the nozzle, formed by anisotropic etching through the nozzle.

To control the refill impedance of an inkjet chamber, it is important to be able to control the ink inlet diameter. A recent publication, U.S. patent application Ser. No. 2003/0109073 Al by Park et al., discusses a method of manufacturing a monolithic ink-jet printhead. The discussion includes the preparation of a silicon substrate, the forming of an ink passage comprised of a manifold that supplies ink, an ink chamber filled with ink supplied from the manifold, an ink channel connecting the ink chamber to the manifold, and a nozzle through which ink is ejected. The ink chamber is formed by isotropically etching the silicon substrate through the nozzle to form the shape of the ink chamber in a hemisphere. The ink channel is formed by anisotropically dry etching the silicon substrate from the bottom surface of the ink chamber through the nozzle. The passage of a Xe—$F_2$ gas through the ink passage dry etches the wall of the ink passage, and permits the smoothing of the wall that more precisely adjusts the passage to some design dimension thereby improving the printing performance of the printhead. This process, however, is limited in the scope of what it can produce. Often there are additional problems and technical needs associated with the production of printheads that require unique inkjet chamber geometries to further enhance writing performance, that are economically unattainable by present processes.

Consequently, a need exists for overcoming the above-described shortcomings.

SUMMARY OF THE INVENTION

The present invention is directed to overcoming one or more of the problems set forth above. Briefly summarized, according to one aspect of the present invention, disclosed is a method for creating an inkjet chamber. The method comprises the steps of firstly providing a substrate having a nozzle opening and secondly etching the substrate through the nozzle opening by alternating between anisotropic and isotropic etching processes for forming a chamber having a shape approximating a cylinder by using multiple hemispheric etches.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has advantages over the prior art in that this invention allows increased manufacturability and performance of an inkjet printhead. The present invention creates an ability to control a plurality of parameters such as nozzle size and finish separately and in relation to chamber geometry and finish of an inkjet printhead. The invention produces cost and performance advantages over prior art in that this ability to control real-time the design parameters of a chamber enables the matching of the system impedance of a printhead by the matching of a required nozzle design to an ink supply chamber. This perfects the system impedance, enhances the system performance, and lowers printhead-manufacturing costs.

DETAILED DESCRIPTION OF THE INVENTION

Figure 1:
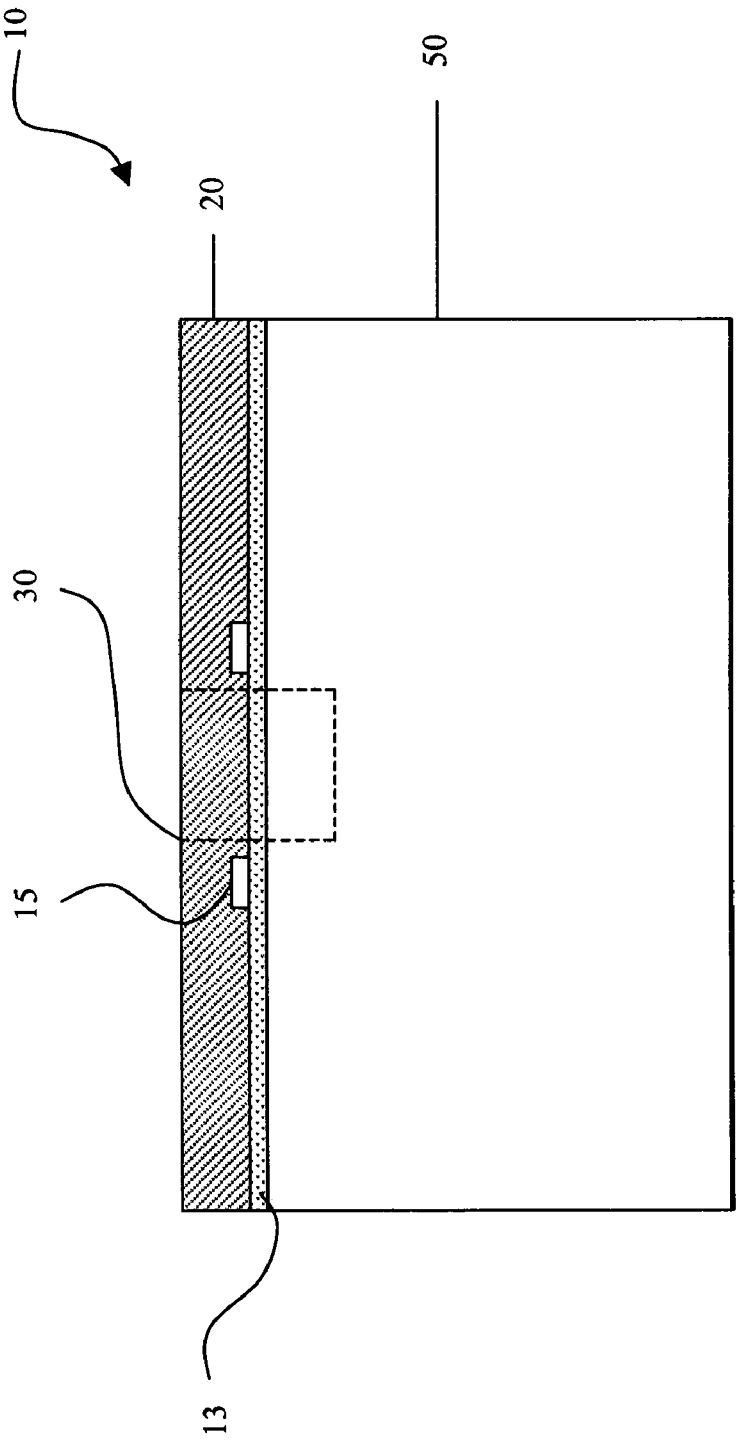
FIG. 1 is a cross-section of an inkjet printhead of the present invention prior to chamber formation.

Referring to FIG. 1, shown is a cross-sectional side view of a section of an inkjet printhead 10, prior to formation of an inkjet chamber, and is representative of a typical unfinished inkjet printhead 10. A nozzle plate 20 is formed on a printhead substrate 50. The nozzle plate 20 additionally includes a nozzle plate bottom layer 13. Disposed upon the nozzle plate bottom layer 13 is a heater 15 that is adjacent to a future nozzle region 30 (shown dashed) wherein a nozzle will be formed. It is useful to note at this point that future nozzle region 30 may also comprise an existing nozzle or orifice prior to performing the etching process. It should be clearly understood at this point that an existing and manufactured inkjet printhead 10 could be re-etched, modified or otherwise re-manufactured through pre-existing features using the etching process herein described.

Figure 2:
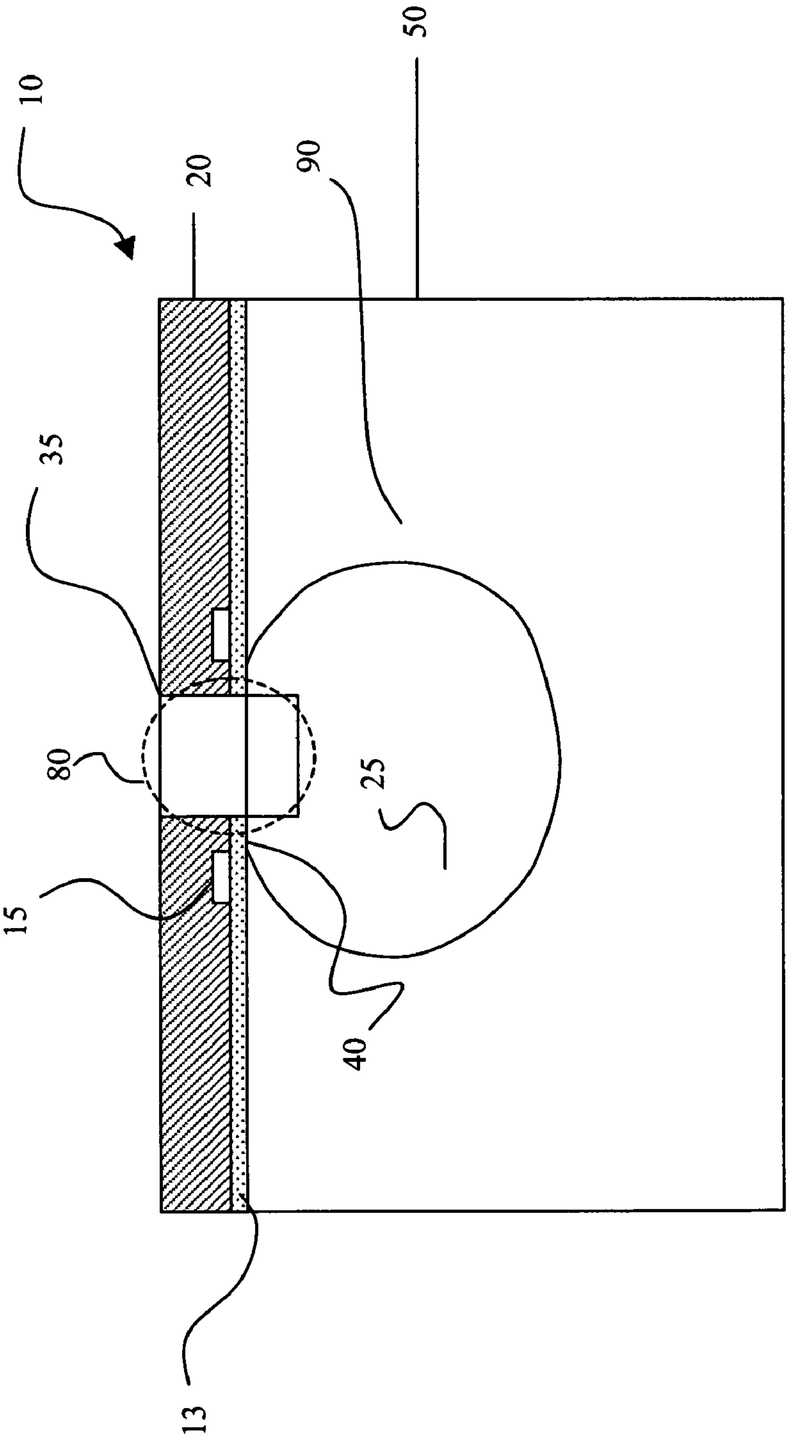
FIG. 2 is a cross-section of an inkjet printhead of the present invention showing a first anisotropic etch and a second isotropic etch.

Referring next to FIG. 2, shown is a cross-sectional side view of an inkjet printhead 10, that details an output nozzle 35, highlighted by a dashed circle, and represents output nozzle 35 being a first etch 80. The first etch 80 produces a first feature that is represented by output nozzle 35, by switching between a first gas such as SULFURHEXAFLUORIDE $SF_6$, and a second gas such as OCTAFLUOROCYCLOBUTANE $C_4F_8$, and produces the beginning of an inkjet chamber 25. Note that the first etch 80 is an anisotropic etch, and produces an essentially cylindrical bore much like that produced by a drill. The second etch 90 using just SULFURHEXAFLUORIDE $SF_6$ alone is an isotropic etch and produces a hemispherically shaped feature. This second etch 90 has the unique ability to produce an undercut of the nozzle plate 20, which in turn will produce a nozzle plate bottom 40. The switching of active gasses in the present invention to produce sequential cuts with different features creates an ability to actively machine an inkjet chamber 25 of inkjet printhead 10 to an optimum shape. Additionally, a finer control of the relative shape of the inkjet chamber 25 is realized through a plurality of sequential isotropic and anisotropic etches.

Figure 3:
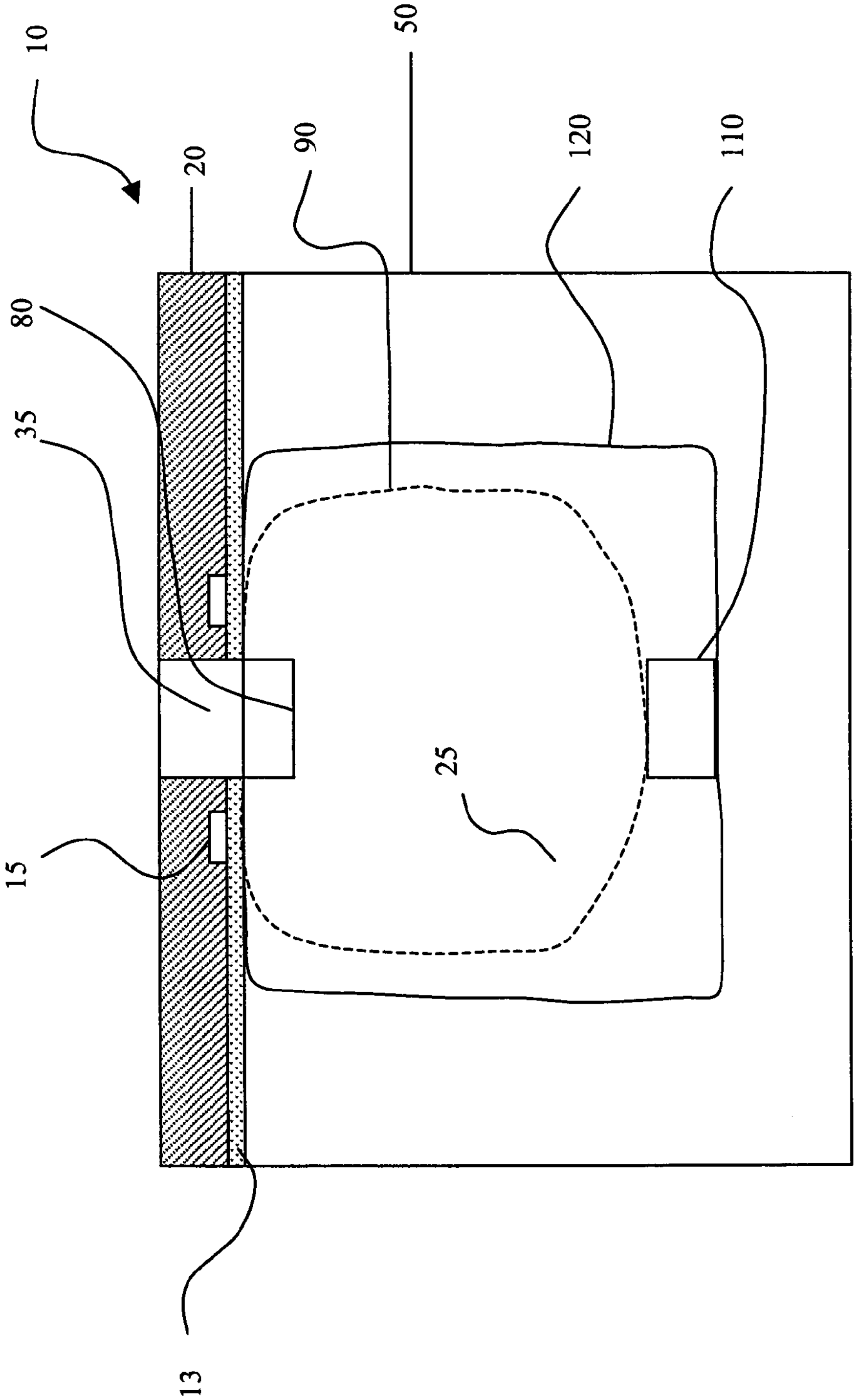
FIG. 3 is a cross-section of an inkjet printhead of the present invention showing a series of alternating anisotropic and isotropic etches.

Referring now to FIG. 3, there is shown an additional cross-sectional side view of the inkjet printhead 10, showing the printhead nozzle plate 20, output nozzle 35, and an inkjet chamber 25, shown dashed, that also represents a finished first operation. The first etch 80 and second etch 90 produces an inkjet chamber 25, and encompasses an essentially hemispheric shape overall. Since an essentially smooth wall surface and a greater etching depth may be desirable within the inkjet printhead 10, the means of producing those results is as follows. Still referring to FIG. 3, a third etch 110 and a fourth etch 120 would be necessary to produce a greater etching depth within the inkjet printhead 10. These additional etching operations wherein the third etch 110, and the fourth etch 120 are anisotropic and isotropic etches respectfully, etch away more printhead material 50, and further serve to shape the inkjet chamber 25. The finish of the new chamber walls created by fourth etch 120 is controllable. By adding a plurality of closely spaced anisotropic and isotropic etching steps, a finely finished but slightly arcuate shaped feature will be achieved. It is important to note at this point that the undercut of the nozzle plate 20 must extend past the outer extremity of the heater 15.

Figure 4:
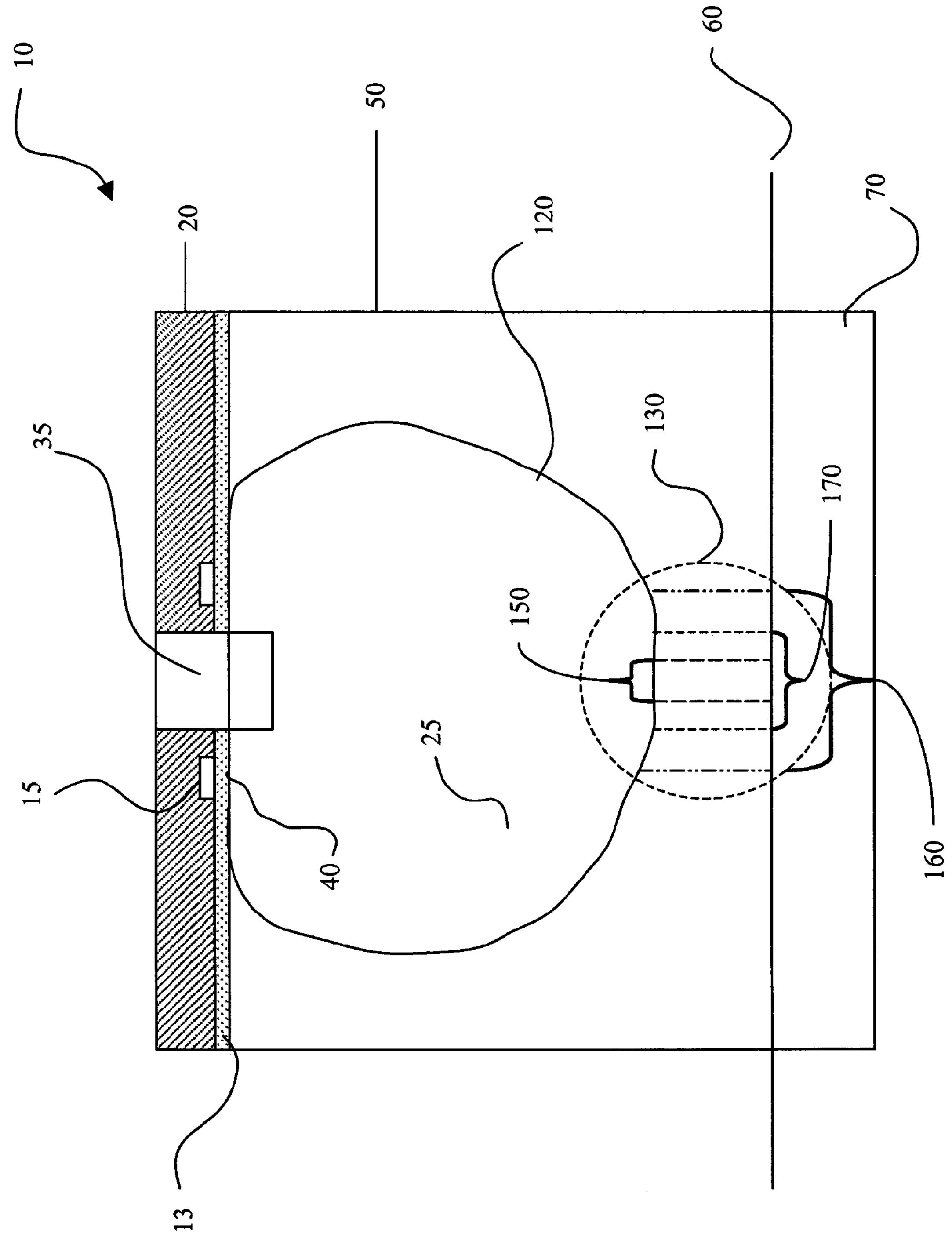
FIG. 4 is a cross-section of an inkjet printhead of the present invention showing a plurality of nozzle and ink supply bores that are attainable by the invention.

Referring now to FIG. 4, there is shown a cross-sectional side view of an inkjet printhead 10 of the present invention. A printhead nozzle plate 20 and a nozzle plate bottom 40 enclose a heater 15 that serves to eject ink from an output nozzle 35. The previously described and completed fourth etch 120 produces a finished chamber wall that possesses the arcuate shaped finish that is produced by the plurality of closely spaced sequential anisotropic and isotropic etches. It should be understood at this point that while four etches are discussed herein, any multiplicity of etches are possible to achieve a desired effect. The ink supply interface 60 separates the printhead material 50 from the ink supply manifold 70. Connecting the finished chamber produced by the fourth etch 120 and the ink supply manifold 70 is an ink supply channel area 130 and the area is defined with a dashed circle. This ink supply channel area 130 and the ability of the present invention to control its size produces an ability to precisely control the operating impedance of the inkjet printhead 10. The operating impedance of printhead 10 is defined as how fast the inkjet chamber 25 refills as a result of ejecting ink by actuating the heating element 15 and ejecting ink through output nozzle 35. It is instructive to note that ink can be defined, as any one of a plurality of substances such as inks, medicines, and liquids comprised of other assorted substances. The operating impedance is controlled by the ability to vary the size of the output nozzle 35 in relation to the size of the ink supply channel area 130. The ink entry port can comprise a plurality of sizes including a small ink entry port 150, large ink entry port 160, and a medium ink entry port 170 that is substantially the same size as the output nozzle 35. The output nozzle 35 and the ink supply channel area 130 can each be of any size necessary to eject a desired volume of ink, and those sizes can be controlled in the etching processes heretofore described. The sizes of the output nozzle 35 and the ink supply channel area 130 are varied by controlling the isotropic etches. By pushing the leading edges of an isotropic etch more or less through the ink supply interface 60, the ink supply channel area 130 can be of a plurality of sizes including the small ink entry port 150, large ink entry port 160, and a medium ink entry port 170. Further, by expanding the edges of an isotropic etch and undercutting the roof bottom 40 the bottom surface of heating element 15 can be exposed and provide maximum heat transfer into the ink.

The invention has been described in detail with particular reference to certain preferred embodiments thereof, but it will be understood that variations and modifications can be effected within the spirit and scope of the invention.

PARTS LIST

| | |
|---|---|
| 10 | inkjet printhead |
| 13 | nozzle plate bottom layer |
| 15 | heater |
| 20 | nozzle plate |
| 25 | inkjet chamber |
| 30 | nozzle region |
| 35 | output nozzle |
| 40 | nozzle plate bottom |
| 50 | printhead substrate |
| 60 | ink supply interface |
| 70 | ink supply manifold |
| 80 | first etch |
| 90 | second etch |
| 110 | third etch |
| 120 | fourth etch |
| 130 | ink supply channel area |
| 150 | small ink entry port |
| 160 | large ink entry port |
| 170 | medium ink entry port |

The invention claimed is:

1. A method for creating an inkjet chamber, the method comprising the steps of:

(a) providing a substrate;

(b) etching the substrate by alternating between anisotropic and isotropic etches to etch an inkjet chamber directly within the substrate having a shape approximating a cylinder by using multiple hemispheric etches, so that there is no need to shape the substrate into a mold to produce the inkjet chamber, wherein each anisotropic etch uses switched first and second gases and each isotropic etch uses just the first gas alone.

2. The method as in claim 1 wherein step (b) is etching through a nozzle above the substrate to form the inkjet chamber only within the substrate.

3. The method as in claim 2 further comprising the step of etching through a portion of the substrate which connects to an ink supply channel in order to create an ink entry port that is substantially the same diameter as the nozzle.

4. The method as in claim 3 further comprising the step of an additional isotropic etch that creates an ink entry port that is substantially larger than the diameter of the nozzle.

5. The method as in claim 2 further comprising the steps of etching through a portion of the substrate which connects to an ink supply channel and masking the nozzle in order to create an ink entry port that is substantially smaller than the diameter of the nozzle.

6. The method as in claim 2 further comprising the step of placing one or more heating elements adjacent the nozzle.

7. The method as in claim 6 further comprising in addition to step (b) the step of undercutting to expose ink to the one or more heating elements.

8. The method as in claim 1, wherein step (b) includes a first step of (c) using the anisotropic etch for forming a first substantially cylinder-shaped bore, or wherein step (b) includes a first step of (d) using the isotropic etch for forming a first substantially hemispherical-shaped bore.

9. The method as in claim 1 further comprising the step of etching through a portion of the substrate which connects to an ink supply channel in order to create an ink entry port.

10. The method as in claim 1 further comprising the step of applying a plurality of sequential anisotropic and isotropic etches in order to obtain an optimum chamber feature.

11. The method as in claim 1 further comprising a heater disposed on a first surface abutting the substrate and the etching process is directed toward the first surface.

12. A method for creating an inkjet chamber, the method comprising the steps of:

(a) providing a substrate;

(b) etching the substrate by alternating between anisotropic and isotropic etches to etch an inkjet chamber directly within the substrate having a shape approximating a cylinder by using multiple hemispheric etches, so that there is no need to shape the substrate into a mold to produce the inkjet chamber, wherein step (b) includes a first step of (c) using an anisotropic etch for forming a first substantially cylinder-shaped bore, or wherein step (b) includes a first step of (d) using an isotropic etch for forming a first substantially hemispherical-shaped bore; and wherein step (b) includes a second step of (e) using an isotropic etch or an anisotropic etch for forming an undercut of a nozzle in the substrate that approximates a first hemispheric etch of the multiple hemispheric etches.

13. The method as in claim 12, wherein step (b) includes a third step of repeating steps (c) or (d) and (e) for forming any number of hemispherical-shaped bores.

* * * * *